(12) United States Patent
Keller

(10) Patent No.: US 6,439,167 B1
(45) Date of Patent: Aug. 27, 2002

(54) PET COLLAR FOR USE WITH PET CONTAINMENT SYSTEM

(75) Inventor: Nadine Keller, Fairfield, CT (US)

(73) Assignee: You Lucky Dog, LLC, CT (US)

( * ) Notice: Subject to any disclaimer, the term of this patent is extended or adjusted under 35 U.S.C. 154(b) by 0 days.

(21) Appl. No.: 09/944,250

(22) Filed: Aug. 31, 2001

Related U.S. Application Data

(60) Provisional application No. 60/228,676, filed on Aug. 29, 2000.

(51) Int. Cl.[7] ............................................. A01K 27/00
(52) U.S. Cl. ..................................................... 119/792
(58) Field of Search ............................... 119/856, 859, 119/858, 850, 769, 792, 793, 794

(56) References Cited

U.S. PATENT DOCUMENTS

| | | | | |
|---|---|---|---|---|
| 2,721,257 A | * | 10/1955 | Knox | |
| 2,996,043 A | * | 8/1961 | Pettingill | |
| 4,173,201 A | * | 11/1979 | Chao et al. | 119/858 |
| 4,539,937 A | * | 9/1985 | Workman | 119/858 |
| 4,876,674 A | | 11/1989 | Parmely | 367/139 |
| 4,909,189 A | * | 3/1990 | Minotti | 119/858 |
| 5,207,178 A | * | 5/1993 | McDade et al. | |
| 5,467,743 A | * | 11/1995 | Doose | 119/864 |
| 5,911,199 A | | 6/1999 | Farkas | 119/859 |
| 6,003,474 A | | 12/1999 | Slater | 119/859 |
| 6,147,610 A | | 11/2000 | Yarnall | 340/573 |
| D439,708 S | | 3/2001 | Jenkins | D30/152 |

* cited by examiner

Primary Examiner—Thomas Price
(74) Attorney, Agent, or Firm—St. Onge Steward Johnston & Reens LLC

(57) ABSTRACT

A collar for use with a pet containment system is provided. The collar includes an inner collar portion having at least one hole passing therethrough and a radio unit attached to the inner collar portion proximate to the hole. The radio unit includes at least one probe protruding therefrom which passes through the hole. The collar also includes an outer cover portion having two ends, one of which is fixedly attached to the inner collar portion on one side of the hole and the other of which defines a free end. The collar further includes a detachable fastening system detachably attaching the free end of the outer cover portion to the inner collar portion on the side of the hole opposite to the side to which the outer cover portion is fixedly attached such that the outer cover portion covers the radio unit, while providing quick and easy access thereto.

19 Claims, 2 Drawing Sheets

PET COLLAR FOR USE WITH PET CONTAINMENT SYSTEM

RELATED APPLICATIONS

The present invention claims the benefit of, under Section 119(e) of Title 35, United States Code, U.S. Provisional Patent Application No. 60/228,676, filed Aug. 29, 2000.

FIELD OF THE INVENTION

The present invention relates to a pet collar, and more particularly to a pet collar which is adapted to be used with pet containment systems which include a receiver attached to the collar, such as electronic fences or the like.

BACKGROUND OF THE INVENTION

The use of so-called "invisible" pet containment systems is becoming increasingly popular. One example of such a system is the electronic fence, which system typically operates by a wire that is buried around the perimeter or boundary of the area in which the animal is to be contained. A radio transmitter is coupled to the buried wire and the animal is fitted with a collar including a radio receiver. When the animal approaches the wire, the radio signal is detected by the receiver on the animal's collar and is used to generate a noise or to mildly electrically shock the animal to stop it from approaching any closer to the boundary.

It should be understood, however, that other types of "invisible" pet containment systems are also known, such as systems which include a radio transmitter positioned at a centralized location and a collar including a radio receiver which is used to generate a noise or to mildly electrically shock the animal when the animal (and the radio receiver therewith) travel out of range of the radio transmitter. It should also be understood that the precise nature of how the pet containment system operates is unimportant, and that the present invention is directed to a collar for use with any system which requires a collar carrying some type of radio receiver or transmitter unit.

Typically, the collar of such systems comprises a simple strip of nylon or other material which has holes passing therethrough which receive electrical probes on the radio receiver which administer a mild shock intended to signal, but not harm, the animal. Also typically, the radio receiver is simply screwed onto the collar, or otherwise attached to the outside thereof.

Such a design, however, presents a number of problems. First, the radio receiver is exposed, and is therefore aesthetically unpleasing. Moreover, the exposed radio receiver may easily become damaged if, for instance, the animal runs into objects, rolls around on the ground, or the like. Furthermore, the exposed radio receiver may easily become entangled in ropes, brush, or the like, thereby trapping and potentially harming the animal. Finally, the exposed radio receiver may injure persons, particularly small children, with whom the animal comes in contact.

Another disadvantage of known pet containment system collars is that no mechanism is typically provided for receiving attachments, such as dog tags and the like. While pet collars having such a mechanism are known, no known electronic fence collar includes such a mechanism.

What is desired, therefore, is a pet collar for use with a pet containment system which is aesthetically pleasing, which does not easily become damaged if, for instance, the animal runs into objects, rolls around on the ground, or the like, which does not easily become entangled in ropes, brush, or the like, thereby trapping and potentially harming the animal, which is not prone to injuring persons, particularly small children, with whom the animal comes in contact, and which includes a mechanism for receiving dog tags and the like.

SUMMARY OF THE INVENTION

Accordingly, it is an object of the present invention to provide a pet collar for use with a pet containment system which is aesthetically pleasing.

Another object of the present invention is to provide a pet collar for use with a pet containment system having the above characteristics and which does not easily become damaged if, for instance, the animal runs into objects, rolls around on the ground, or the like.

A further object of the present invention is to provide a pet collar for use with a pet containment system having the above characteristics and which does not easily become entangled in ropes, brush, or the like, thereby trapping and potentially harming the animal.

Still another object of the present invention is to provide a pet collar for use with a pet containment system having the above characteristics and which is not prone to injuring persons, particularly small children, with whom the animal comes in contact.

Yet a further object of the present invention is to provide a pet collar for use with a pet containment system having the above characteristics and which includes a mechanism for receiving dog tags and the like.

These and other objects of the present invention are achieved by provision of a pet collar for use with a pet containment system. The pet collar includes an inner collar portion having at least one hole passing therethrough and a radio unit attached to the inner collar portion proximate to the at least one hole. The radio unit includes at least one probe protruding therefrom, which at least one probe passes through the at least one hole. The collar also includes an outer cover portion having two ends, one end of which is fixedly attached to the inner collar portion on one side of the at least one hole and the other end of which defines a free end. The collar further includes a detachable fastening system detachably attaching the free end of the outer cover portion to the inner collar portion on a side of the at least one hole opposite to the side of the at least one hole to which the outer cover portion is fixedly attached such that the outer cover portion covers the radio unit, while providing quick and easy access thereto. The detachable fastening system comprising a pair of cooperating fastener members, one of the pair of the cooperating fastener members being attached to an outer surface of the inner collar portion on the side of the at least one hole opposite to the side of the at least one hole to which the outer cover portion is fixedly attached and the other of the pair of the cooperating fastener members being attached to an inner surface of the free end of the outer cover portion.

In one preferred embodiment, the detachable fastening system may comprise a hook-and-loop fastening system, wherein one of the pair of cooperating fastener members comprises a hook portion of the hook-and-loop fastening system, and the other of the pair of cooperating fastener members comprises a loop portion of the hook-and-loop fastening system. In another preferred embodiment, the detachable fastening system may comprise a snap, wherein one of the pair of cooperating fastener members comprises a male member of the snap, and the other of the pair of cooperating fastener members comprises a female member of the snap.

Preferably, the at least one hole comprises two holes and the radio unit includes two probes protruding therefrom, the two probes passing through the two holes. It is also preferable that the at least one probe protruding from the radio unit includes a threaded outer surface, and that the pet collar further includes at least one threaded nut for engaging the threaded outer surface of the at least one probe in order to attach the radio unit to the inner collar member. Most preferably, the radio unit comprises a radio receiver.

The one end of the outer cover portion is preferably fixedly attached to the inner collar portion on one side of the at least one hole by stitching. It is also preferable that the pet collar further include a clasp for facilitating the attaching and removing of the pet collar from an animal.

The invention and its particular features and advantages will become more apparent from the following detailed description considered with reference to the accompanying drawings.

DETAILED DESCRIPTION OF THE INVENTION

Figure 1:
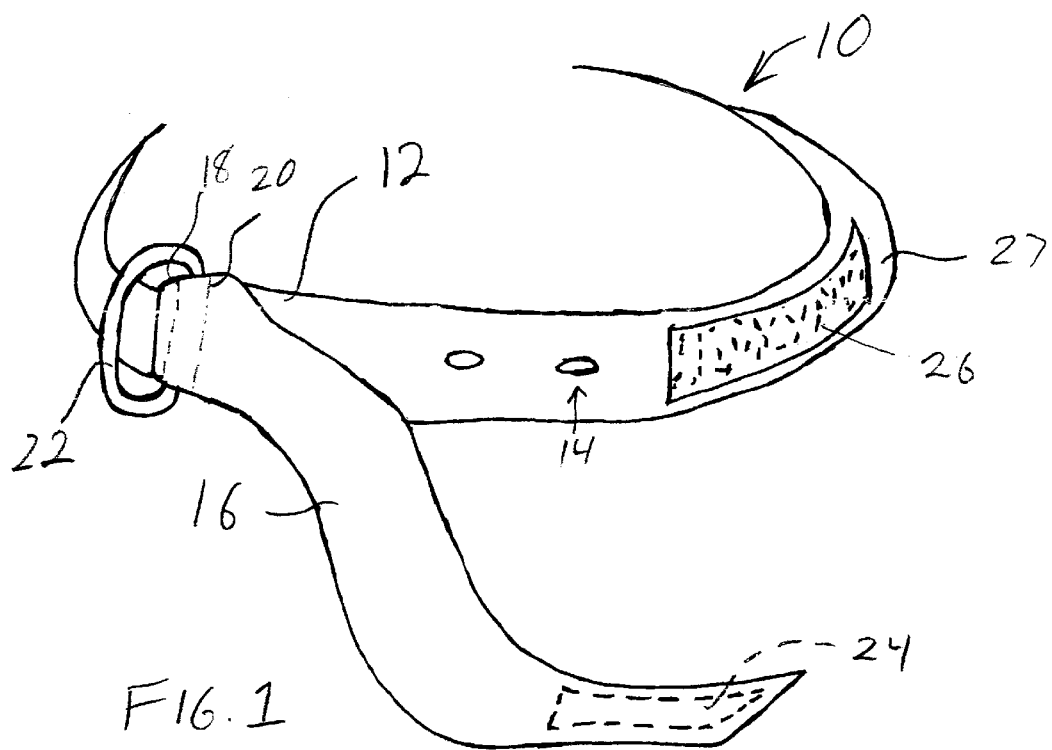
FIG. 1 is a side isometric view of a pet collar for use with a pet containment system in accordance with the present invention.
Figure 3:
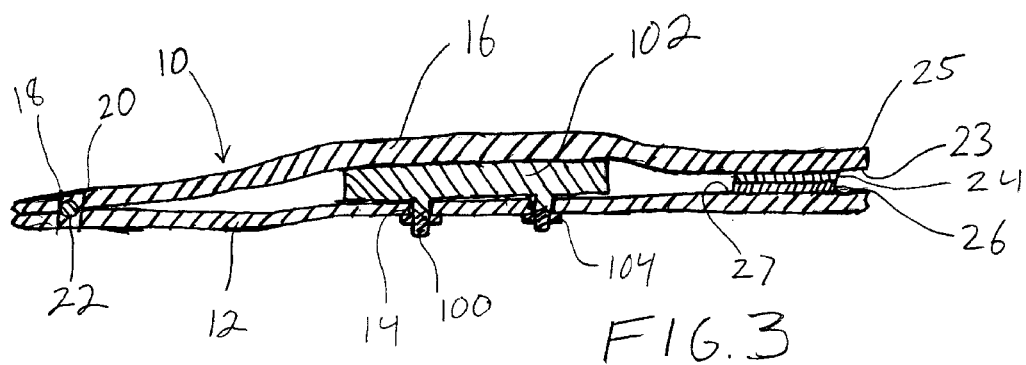
FIG. 3 is a partially cross-sectional view of a portion of the pet collar for use with a pet containment system of FIG. 1.

Referring first to FIGS. 1 and 3, a pet collar 10 for use with a pet containment system, such as by way of illustration and not limitation, an electronic fence, is shown. Pet collar 10 includes an inner collar portion 12, which may be formed from nylon, or any other appropriate material known in the art. Inner collar portion 12 has therein at least one, and preferably two, holes 14 for receiving an electrical probe or probes 100 on a radio unit 102 so that they may contact the animal wearing the collar. In known pet containment systems, radio unit 102 is typically a receiver, although it should be understood by those skilled in the art that radio unit 102 may just as easily be a transmitter. As is well known in the art, probes 100 of radio unit 102 typically contact the animal in order to administer a mild shock intended to signal, but not harm, the animal.

Inner collar portion 12 and/or radio unit 102 also include some mechanism for attaching the radio unit 102 to the collar 10. For example, in the embodiment shown in FIG. 3, probes 100 include male threads, which, after probes are passed through holes 14 in inner collar portion 12, are engaged by threaded nuts 104, thereby securing radio unit 102 to inner collar portion 12. It should be understood, however, that other mechanisms may be used to secure radio unit 102 to inner collar portion 12.

Attached to inner collar portion 12 on one side of holes 14, is cover portion 16. Cover portion 16 is preferably permanently attached to inner collar portion 12 on this side by, for example, stitching or the like. Most preferably, two stitching seams 18,20 are provided with a D-ring 22 stitched therebetween to accommodate dog tags or the like. Cover portion 16 may be formed from nylon, or any other appropriate material known in the art, and is preferably formed of the same material as inner collar portion 12.

Figure 4:
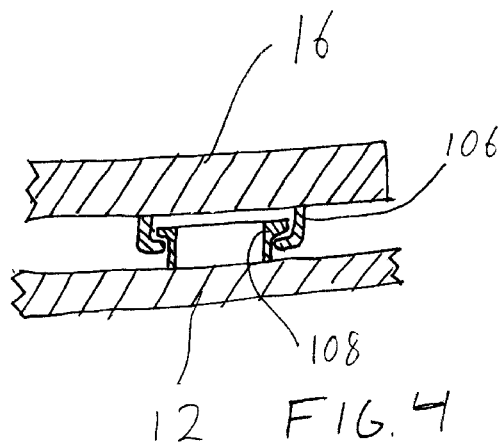
FIG. 4 is an enlarged partially cross-sectional view of a portion of the pet collar for use with a pet containment system similar to FIG. 3, but with hook-and-loop fasteners being replaced with snap members.

Attached to the inside surface 23 of the free end 25 of cover portion 16 is a piece 24 of either the hook portion or the loop portion of a hook-and-loop fastener, such as VELCRO® hook-and-loop fastener. The mating piece 26 of the hook-and-loop fastener is attached to the outer surface 27 of inner collar portion 12 on the side of holes 14 opposite to the side of permanent attachment (i.e., stitching seams 18,20). Mating piece 26 of hook-and-loop fastener is positioned such that cover portion 16 has enough slack to accommodate the radio unit 102 between inner collar portion 12 and cover portion 16. It should be noted that hook-and-loop fastener pieces 24,26 are desirable so that the radio unit 102 can be quickly and easily accessed, and to accommodate radio units of various sizes. However, it should also be understood that other attachment mechanisms may be substituted for the hook-and-loop fasteners, such as snap members 106,108 (FIG. 4) or the like.

Figure 2:
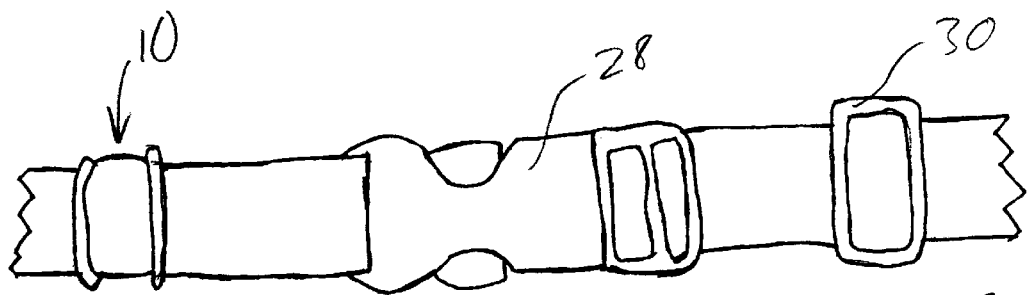
FIG. 2 is plan view of a clasp which may be used with the pet collar for use with a pet containment system of FIG. 1.

Most preferably, the exposed portions of inner collar portion 12 and cover portion 16 are covered with a decorative fabric or some other aesthetically pleasing pattern or material. Moreover, referring now to FIG. 2, a clasp 28, or a belt connection (not shown), is preferably provided for facilitating the attaching and removing of collar 10 from an animal. Also preferably, a means 30 for adjusting the size of collar 10 is provided.

The present invention, therefore, provides a pet collar for use with a pet containment system which is aesthetically pleasing, which does not easily become damaged if, for instance, the animal runs into objects, rolls around on the ground, or the like, which does not easily become entangled in ropes, brush, or the like, thereby trapping and potentially harming the animal, which is not prone to injuring persons, particularly small children, with whom the animal comes in contact, and which includes a mechanism for receiving dog tags and the like.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A pet collar for use with a pet containment system, said pet collar comprising:
  an inner collar portion having at least one hole passing therethrough;
  a radio unit attached to said inner collar portion proximate to the at least one hole, said radio unit having at least one probe protruding therefrom, the at least one probe passing through the at least one hole;
  an outer cover portion having two ends, one end of said outer cover portion fixedly attached to said inner collar portion on one side of the at least one hole and the other end of said outer cover portion defining a free end;
  a detachable fastening system detachably attaching the free end of said outer cover portion to said inner collar portion on a side of the at least one hole opposite to the side of the at least one hole to which said outer cover portion is fixedly attached such that said outer cover portion covers said radio unit, while providing quick and easy access thereto, said detachable fastening system comprising a pair of cooperating fastener members, one of the pair of the cooperating fastener members being attached to an outer surface of said inner collar portion on the side of the at least one hole opposite to the side of the at least one hole to which said outer cover portion is fixedly attached and the other of the pair of the cooperating fastener members being attached to an inner surface of the free end of said outer cover portion.

2. The pet collar of claim 1 wherein said detachable fastening system comprises a hook-and-loop fastening system, and wherein one of the pair of cooperating fastener members comprises a hook portion of the hook-and-loop fastening system, and the other of the pair of cooperating fastener members comprises a loop portion of the hook-and-loop fastening system.

3. The pet collar of claim 1 wherein said detachable fastening system comprises a snap, and wherein one of the pair of cooperating fastener members comprises a male member of the snap, and the other of the pair of cooperating fastener members comprises a female member of the snap.

4. The pet collar of claim 1 wherein said radio unit comprises a radio receiver.

5. The pet collar of claim 1 wherein the at least one hole comprises two holes and wherein said radio unit includes two probes protruding therefrom, the two probes passing through the two holes.

6. The pet collar of claim 1 wherein the at least one probe protruding from said radio unit includes a threaded outer surface, and wherein said pet collar further comprises at least one threaded nut for engaging the threaded outer surface of the at least one probe in order to attach said radio unit to said inner collar member.

7. The pet collar of claim 1 wherein the one end of said outer cover portion is fixedly attached to said inner collar portion on one side of the at least one hole by stitching.

8. The pet collar of claim 1 further comprising a clasp for facilitating the attaching and removing of the pet collar from an animal.

9. A pet collar for use with a pet containment system, said pet collar comprising:
   an inner collar portion having two holes passing therethrough;
   a radio receiver attached to said inner collar portion proximate to the holes, said radio receiver having two probe protruding therefrom, the probes passing through the holes and each having a threaded outer surface;
   two threaded nuts for engaging the threaded outer surfaces of the probes in order to attach said radio receiver to said inner collar member;
   an outer cover portion having two ends, one end of said outer cover portion fixedly attached by stitching to said inner collar portion on one side of the holes and the other end of said outer cover portion defining a free end;
   a hook-and-loop fastening system detachably attaching the free end of said outer cover portion to said inner collar portion on a side of the holes opposite to the side of the holes to which said outer cover portion is fixedly attached such that said outer cover portion covers said radio receiver, while providing quick and easy access thereto, said hook-and-loop fastening system comprising a hook portion and a loop portion, one of the hook portion or the loop portion being attached to an outer surface of said inner collar portion on the side of the holes opposite to the side of the holes to which said outer cover portion is fixedly attached and the other of the hook portion or the loop portion being attached to an inner surface of the free end of said outer cover portion.

10. The pet collar of claim 9 further comprising a clasp for facilitating the attaching and removing of the pet collar from an animal.

11. A pet collar for use with a pet containment system which includes a radio unit having at least one probe protruding therefrom to be worn by an animal, said pet collar comprising:
   an inner collar portion having at least one hole passing therethrough for receiving therethrough the at least one probe of the radio unit;
   an outer cover portion having two ends, one end of said outer cover portion fixedly attached to said inner collar portion on one side of the at least one hole and the other end of said outer cover portion defining a free end;
   a detachable fastening system detachably attaching the free end of said outer cover portion to said inner collar portion on a side of the at least one hole opposite to the side of the at least one hole to which said outer cover portion is fixedly attached such that said outer cover portion covers the radio unit, while providing quick and easy access thereto, said detachable fastening system comprising a pair of cooperating fastener members, one of the pair of the cooperating fastener members being attached to an outer surface of said inner collar portion on the side of the at least one hole opposite to the side of the at least one hole to which said outer cover portion is fixedly attached and the other of the pair of the cooperating fastener members being attached to an inner surface of the free end of said outer cover portion.

12. The pet collar of claim 11 wherein said detachable fastening system comprises a hook-and-loop fastening system, and wherein one of the pair of cooperating fastener members comprises a hook portion of the hook-and-loop fastening system, and the other of the pair of cooperating fastener members comprises a loop portion of the hook-and-loop fastening system.

13. The pet collar of claim 11 wherein said detachable fastening system comprises a snap, and wherein one of the pair of cooperating fastener members comprises a male member of the snap, and the other of the pair of cooperating fastener members comprises a female member of the snap.

14. The pet collar of claim 11 wherein the radio unit includes two probes protruding therefrom and wherein the at least one hole comprises two holes for receiving the two probes passing therethrough.

15. The pet collar of claim 11 wherein the at least one probe protruding from the radio unit includes a threaded outer surface, and wherein said pet collar further comprises at least one threaded nut for engaging the threaded outer surface of the at least one probe in order to attach the radio unit to said inner collar member.

16. The pet collar of claim 11 wherein the one end of said outer cover portion is fixedly attached to said inner collar portion on one side of the at least one hole by stitching.

17. The pet collar of claim 11 further comprising a clasp for facilitating the attaching and removing of the pet collar from an animal.

18. A pet collar for use with a pet containment system which includes a radio receiver having two probes protruding therefrom to be worn by an animal, each of the probes having a threaded outer surface, said pet collar comprising:
   an inner collar portion having two holes passing therethrough for receiving therethrough the probes of the radio receiver;
   two threaded nuts for engaging the threaded outer surfaces of the probes in order to attach the radio receiver to said inner collar member;

an outer cover portion having two ends, one end of said outer cover portion fixedly attached by stitching to said inner collar portion on one side of the holes and the other end of said outer cover portion defining a free end;

a hook-and-loop fastening system detachably attaching the free end of said outer cover portion to said inner collar portion on a side of the holes opposite to the side of the holes to which said outer cover portion is fixedly attached such that said outer cover portion covers the radio receiver, while providing quick and easy access thereto, said hook-and-loop fastening system comprising a hook portion and a loop portion, one of the hook portion or the loop portion being attached to an outer surface of said inner collar portion on the side of the holes opposite to the side of the holes to which said outer cover portion is fixedly attached and the other of the hook portion or the loop portion being attached to an inner surface of the free end of said outer cover portion.

19. The pet collar of claim 18 further comprising a clasp for facilitating the attaching and removing of the pet collar from an animal.

* * * * *